May 23, 1967  A. V. NEY  3,320,973
APPARATUS FOR CONTROLLING FLUID FLOW
Filed Dec. 31, 1964  3 Sheets-Sheet 1
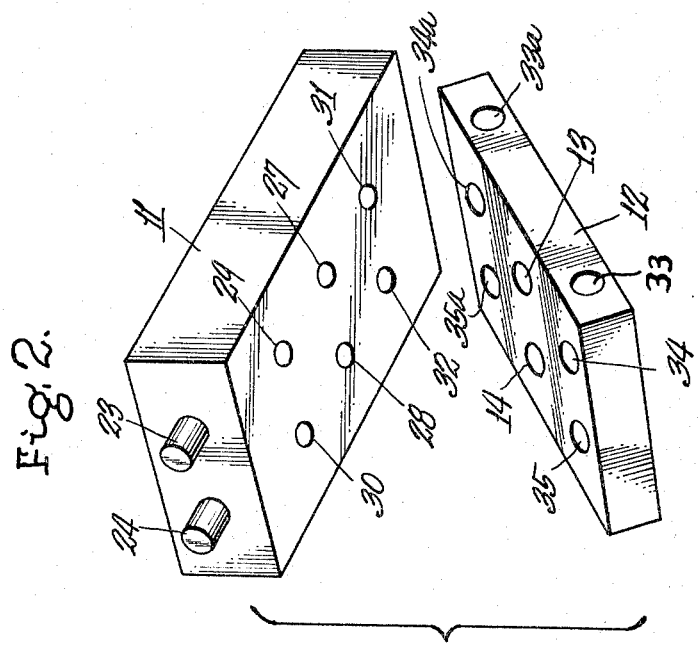
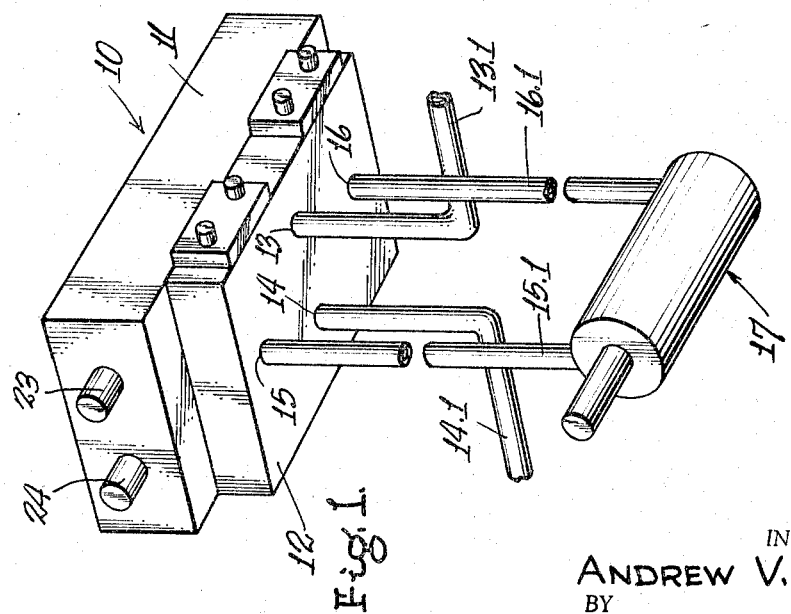
INVENTOR.
ANDREW V. NEY
BY
*Williams and Kreake*
ATTORNEYS

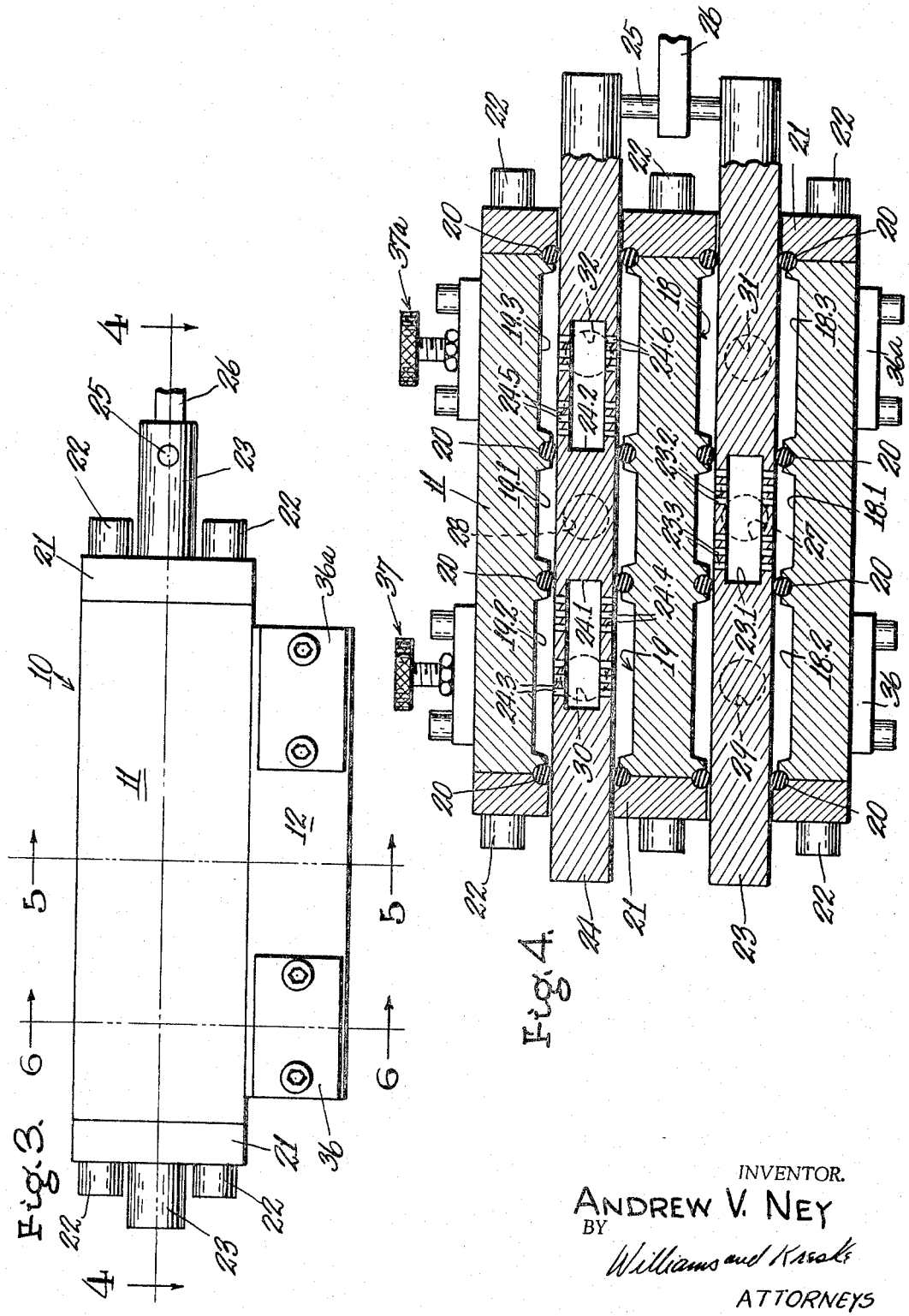

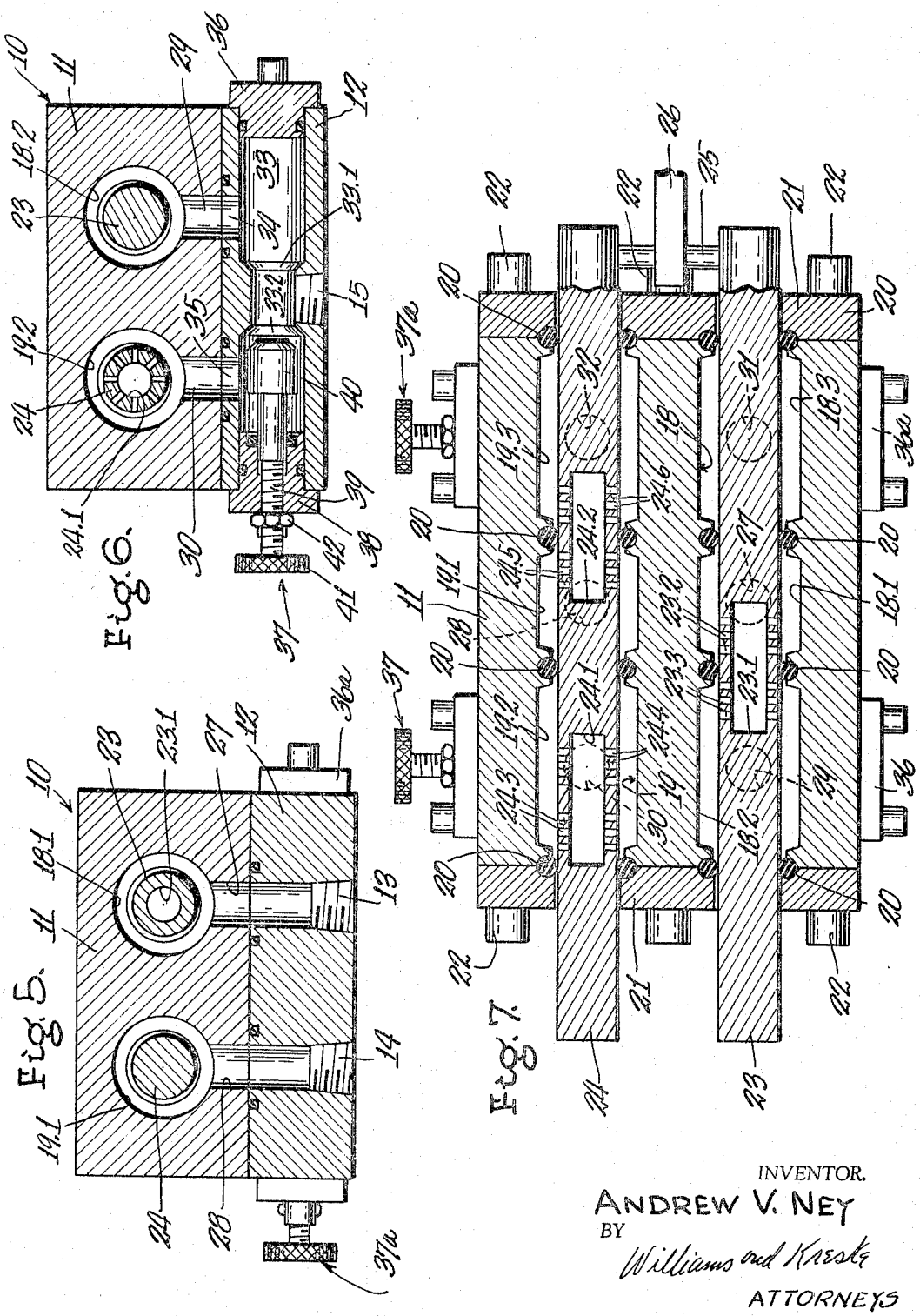

United States Patent Office 3,320,973
Patented May 23, 1967

3,320,973
APPARATUS FOR CONTROLLING FLUID FLOW
Andrew V. Ney, Alliance, Ohio, assignor to
Salem Valve Company, Salem, Ohio
Filed Dec. 31, 1964, Ser. No. 422,712
6 Claims. (Cl. 137—596)

The present invention relates to fluid pressure systems and devices, more particularly to systems and devices for controlling fluid flow, and the principal object of the invention is to provide new and improved apparatus of the character described.

When controlling operation of a fluid pressure motor, such as a fluid cylinder, it is frequently desirable to limit motor speed below its potential value. This is usually done by restricting fluid flow either toward or away from the cylinder. In some cases, the problem can be solved merely by restricting fluid flow through a fluid conduit connected to the cylinder. Unfortunately in many systems, the conduit connected to the fluid cylinder carries fluid in one direction when the cylinder operates in one direction and carries fluid in the opposite direction when the cylinder operates in the opposite direction. In such event, the restriction in the conduit has the frequently undesirable effect of limiting the speed of cylinder operation in the same manner in either of its operating directions.

In order to limit cylinder speed in but one direction, it has been common practice to provide a by-pass circuit around the conduit restriction and to place a check valve in such circuit. With such arrangement, fluid flow in one direction through the conduit will seat the check valve and thus compel all fluid to pass through the restriction to thus limit cylinder operating speed. In the other direction of fluid flow through the conduit, the check valve will be unseated to permit free flow of fluid around the restriction thus providing for unimpeded cylinder operation.

While the use of a conduit restriction in combination with a check valve in a by-pass circuit functions generally satisfactorily to limit cylinder operating speed in but one direction of cylinder operation, the check valve is always a potential source of malfunction. Furthermore, the check valve and by-pass circuit materially increase the cost of the system, its size, complexity and maintenance.

In contrast, the present invention provides the same function as does the restriction and check valve aforesaid but without the use of a check valve and its associated disadvantages. These and other advantages will readily become apparent from a study of the following description and from the drawings appended hereto.

In the drawings accompanying this specification and forming a part of this application there is shown, for purpose of illustration, an embodiment which the invention may assume, and in these drawings:

FIGURE 1 is a perspective view of a fluid control valve embodying the present invention, the valve being shown combined in a fluid circuit with a double-acting fluid cylinder of any conventional construction, FIGURE 2 is a fragmentary, exploded perspective view of the valve seen in FIGURE 1, FIGURE 3 is an enlarged, side elevational view of the valve seen in FIGURE 1, FIGURE 4 is a sectional view generally corresponding to the line 4—4 of FIGURE 3, FIGURES 5 and 6 are sectional views generally corresponding to the lines 5—5 and 6—6 respectively of FIGURE 3, and FIGURE 7 is a view similar to FIGURE 4 but with certain parts shown in another position.

With reference first to FIGURE 1, there is shown a fluid control valve 10 which comprises a valve housing 11 mounted on a sub-base 12. The lower face of base 12 is provided with a main inlet port 13 and a main exhaust port 14 to which suitable conduits may be connected. The lower face of the base also has a pair of operating ports 15, 16 having conduit connection with respective ends of a fluid cylinder 17.

Referring now to FIGURE 4, valve housing 11 is provided with valve bores 18 and 19 in laterally spaced, side-by-side relation. Suitable sealing members 20, herein shown to be O rings, divide each housing bore into end and intermediate chambers. Thus, valve bore 18 is divided into an intermediate chamber 18.1 and end chambers 18.2, 18.3 while bore 19 is divided into an intermediate chamber 19.1 and end chambers 19.2, 19.3. End plates 21 are secured by capscrews 22 to respective ends of the housing 11 to retain the endmost O rings 20 in position. End plates 21 are apertured to slidably pass sleeve valve members 23, 24 which will next be described in detail.

With reference first to the valve member 23, the latter comprises an elongated, round in cross-section rod in the bore 18 and with which the appropriate O rings 20 have sealing engagement to close the chambers 18.1, 18.2 and 18.3 from communication with each other. An intermediate portion of the valve member 23 is hollowed out to provide a chamber 23.1 and a plurality of transverse apertures 23.2, 23.3 extend from the periphery of the member to respective ends of the chamber 23.1. In the position of parts shown in FIGURE 4, all of the apertures 23.2, 23.3 are within the confines of bore chamber 18.1 for a purpose to appear.

Valve member 24 is similar to valve member 23 but is disposed in the bore 19 and provides axially spaced chambers 24.1 and 24.2. Communicating with respective ends of valve member chamber 24.1 are apertures 24.3, 24.4 and communicating with respective ends of valve member chamber 24.2 are apertures 24.5, 24.6. Note that in the position of parts shown all of the apertures 24.3 and 24.4 are within the confines of bore chamber 19.2 while all of the apertures 24.5 and 24.6 are within the confines of the bore chamber 19.3. Valve members 23, 24 are connected together for simultaneous, longitudinal movement by means of a pin 25 to which is connected a suitable actuator 26. Operation of the valve members 23, 24 in controlling fluid flow will later be described.

Referring to FIGURES 2, 4 and 5, a main inlet passage 27 extends from valve bore chamber 18.1 and terminates in a port at the lower face of the valve housing 11. Similarly, a main exhaust passage 28 extends from valve bore chamber 19.1 and terminates at the lower face of the valve housing. As best seen in FIGURE 5, passage and port 27 register and communicate with sub-base port and passage 13 previously referred to in connection with FIGURES 1 and 2 while passage and port 28 register and communicate with sub-base port and passage 14.

Turning to FIGURES 2, 4 and 6, a branch inlet passage, or conduit, 29 extends from valve bore chamber 18.2 and terminates in a port at the lower face of the valve housing 11. Similarly, a branch outlet passage, or conduit, 30 extends from valve bore chamber 19.2 and terminates in a port at the lower face of the valve housing. Although seen only in FIGURES 2 and 4, branch inlet and outlet passages or conduits 31, 32 extend from valve bore chambers 18.3, 19.3 respectively, and terminate in respective ports at the lower housing face.

As best seen in FIGURE 6, sub-base 12 has a transversely extending chamber 33, whose intermediate portion communicates with operating port 15 and whose end portions respectively communicate with the inlet branch passage 29 and the outlet branch passage 30 via passages 34, 35 respectively. The intermediate portion of chamber 33 is reduced in size to provide valve seats 33.1 and 33.2 on respective sides of the operating port 15. In the present embodiment and in the position of parts viewed, the right end of chamber 33 is closed by a plug 36 while the left end is closed by a throttling valve assembly 37.

Throttling valve assembly 37 comprises a plug 38 through which is threaded the shank 39 of a valve whose head 40 cooperates with the seat 33.2. A knurled wheel 41 on the shank 39 provides means for rotating the latter to shift the head 40 toward and away from its seat 33.2 while a lock nut 42 secures the shank in adjusted position. In operation, head 40 cooperates with seat 33.2 to provide an adjustable restriction to fluid flow between the outlet branch passage 30 and the operating port 15.

Although not shown in detail, sub-base 12 also has a transversely extending chamber 33a (FIGURE 2) whose end portions communicate with the valve housing inlet branch ports and passages 31, 32 via passages 34a, 35a. The intermediate portion of chamber 33a communicates with the operating port 16 and is in other respects similar to the chamber 33. As viewed in FIGURES 4 and 5, one end of chamber 33a may be closed by a plug 36a similar to plug 36, while the other end of the chamber may contain a valve assembly 37a similar to valve assembly 37.

With respect to FIGURE 1 and assuming that a source of fluid pressure is connected to the port 13 of the valve 10 through a conduit 13.1, that operating ports 15 and 16 are connected to respective ends of fluid cylinder 17 by means of conduits 15.1, 16.1 respectively, and that port 14 has a conduit 14.1 connected thereto for returning exhausted fluid back to its source or otherwise disposing of the same, operation will be as follows:

With the valve ports positioned as seen in FIGURE 4, it will be noted that valve bore chamber 18.1 is closed off from both chambers 18.2, 18.3 and that chamber 19.1 is closed off from chambers 19.2, 19.3. Thus, fluid will be trapped in the sub-base chambers 33, 33a and in the conduits 15.1, 16.1 to maintain the piston of fluid cylinder 17 locked against movement in either direction.

If the valve members 23, 24 are now shifted from the position seen in FIGURE 4 to the positions seen in FIGURE 7, communication will be established between the valve bore chambers 18.1, 18.2 through the valve member chamber 23.1 and the apertures 23.2, 23.3. Communication will also be established between the valve bore chambers 19.1, 19.3 through the valve member chamber 24.2 and the apertures 24.5, 24.6. Since chambers 18.1, 18.2 are in communication, fluid pressure will now flow from the former to the latter and thence to sub-base chamber 33 via the passage 34. Such fluid will also flow into the chamber 19.2 through the passages 35 and 30; however, such fluid will be trapped in chamber 19.2 since this chamber is not in communication with chamber 19.1 at this time. Fluid pressure in chamber 33 will flow through operating port 15 and to one end of cylinder 17 (FIGURE 1) via the conduit 15.1, the flow being unaffected by the valve assembly 37 as will be evident.

With fluid under pressure entering one end of cylinder 17, the piston thereof will be caused to move providing fluid at the other end of the cylinder is permitted to escape. Such fluid escape is provided through the conduit 16.1, port 16, chamber 33a of sub-base 12 past the valve assembly 37a in chamber 33a, into valve bore chamber 19.3 via passages 35a and 32, into valve bore chamber 19.1 via the valve member chamber 24.2 and apertures 24.5, 24.6, and out through exhaust conduit 14.1 via passages and ports 28 and 14. With exhaust fluid in sub-base chamber 33a, such fluid will flow into valve bore chamber 18.3; however, there is no escape for fluid from this chamber at this time since this chamber is not in communication with bore chamber 18.1.

It is to be understood that with fluid flowing through sub-base chamber 33a and past the valve assembly 37a, the latter will throttle the flow of fluid to thus control the speed of operation of the cylinder 17.

When operation of cylinder 17 as above described is to be terminated, the valve members 23, 24 will be returned to the positions seen in FIGURE 4 to thereupon trap the fluid at both ends of the cylinder as previously described.

When cylinder 17 is to be operated in the opposite direction from that previously described, valve members 23, 24 will be shifted from the position seen in FIGURE 4 to dispose the valve member apertures 23.2 in the bore chamber 18.3 while the apertures 23.3 remain in the bore chamber 18.1. Such movement of the valve members will also position the valve member apertures 24.4 in the bore chamber 19.1 while the apertures 24.3 remain in the bore chamber 19.2 and the apertures 24.5, 24.6 remain in the bore chamber 19.3.

With the valve members 23, 24 thus positioned, pressurized fluid from the valve bore chamber 18.1 will enter the adjoining chamber 18.3 through the valve member chamber 23.1 and the apertures 23.3, 23.2 and will pass to one end of the fluid cylinder 17 through the housing conduit and port 31, the sub-base passage 34a, the sub-base chamber 33a, the bottom side base port 16, and the conduit 16.1. Fluid from the opposite end of the cylinder 17 will exit through the conduit 15.1, the sub-base bottom side port 15, into the sub-base chamber 33, past the valve assembly 37 through the passage 35 and the port and conduit 30 to the valve bore chamber 19.2, and to the exhaust conduit 14.1 via the valve member chamber 24.1 and its apertures 24.3, 24.4, the adjoining valve bore chamber 19.1 and port 28 and its corresponding sub-base conduit and port 14. As the outgoing fluid flows past the valve assembly 37, it will be restricted as previously described to control the speed of operation of the cylinder 17.

Experience indicates that in most cases, speed control of a fluid cylinder is best obtained by restricting fluid flow away from the cylinder rather than fluid flow toward the cylinder; accordingly, valve assemblies 37, 37a have been shown and described as positioned to restrict fluid flow in a direction away from respective ends of cylinder 17. Under special circumstances, however, it will be evident that either or both of the valve assemblies could be reversed with their associated plugs 36 or 36a so as to restrict fluid flow toward the cylinder 17. Moreover, in the event speed control of the cylinder 17 is to be effectuated in but one direction, one of the valve assemblies could be eliminated and replaced by a plug similar to plugs 36, 36a. Additionally, both valve assemblies could be placed in the same sub-base bore (either 33 or 33a, thus simplifying the sub-base structure by eliminating one of the sub-base bores) so that while fluid flow will be restricted in both directions of cylinder operation, fluid flow from the cylinder will be restricted in one direction of operation thereof and fluid flow to the cylinder will be restricted in the other direction of operation thereof.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:
1. A valve assembly for use in a fluid pressure system which includes a fluid motor, comprising
   (A) a valve housing having

(a) an inlet port connectable to a source of fluid pressure,
(b) an operating port connectable to said fluid motor and through which fluid may flow toward and away from said motor,
(c) an outlet port through which fluid may be discharged from said motor,
(d) a first chamber means in communication with said inlet and outlet ports,
(e) spaced inlet and outlet passages co-extending from said first chamber means,
(f) an elongated second chamber extending transversely of said passages and having axially spaced portions intersecting the latter and a portion intermediate said axially spaced portions in communication with said operating port, (B) valve means within said first chamber means and in one position providing for fluid flow between said inlet port and said inlet passage and preventing fluid flow between said outlet port and said outlet passage, and in another position preventing fluid flow between said inlet port and said inlet passage and providing for fluid flow between said outlet port and said outlet passage, (C) and flow control means disposed in said second chamber between one of said axially spaced second chamber portions and said intermediate second chamber portion to limit flow of fluid through such one of said axially spaced second chamber portions without affecting fluid flow through the other of said axially spaced second chamber portions.

2. The construction of claim 1 wherein said valve housing comprises main and auxiliary portions removably secured together and wherein said first chamber means is formed in said main housing portion and said second chamber is formed in said auxiliary housing portion.

3. The construction of claim 2 wherein said second chamber extends between opposed auxiliary housing faces and wherein said flow control means is assembled with said auxiliary housing from one of the faces aforesaid.

4. The construction of claim 3 wherein said means may be assembled with said auxiliary housing from either of said opposed faces to selectively restrict fluid flow either to or from the fluid motor.

5. The construction of claim 2 wherein said valve housing has a pair of operating ports, wherein said housing has a pair of second chambers extending between opposed, spaced-apart auxiliary housing faces and communicating with respective operating ports, wherein two pair of inlet and outlet passages co-extend from said first chamber means, wherein one of said second chambers intersects one of said pair of passages and the other of said second chambers intersects the other of said pair of passages, wherein said first chamber means comprises an inlet chamber in communication with said inlet port and both of said inlet passages and an outlet chamber in side-by-side relation with said inlet chamber and in communication with said outlet port and both of said outlet passages, wherein said valve means comprises respective valve members in said inlet and outlet chambers connected for unitary movement, said valve members in one position providing for fluid flow to one of said second chambers and fluid flow from the other of said second chambers, and in another position providing for flow to the other of said second chambers and fluid flow from said one of said second chambers, and wherein said flow control means may be selectively disposed in either of said second chambers and between either of said axially spaced second chamber portions and such second chamber intermediate portion to selectively limit flow of fluid to either of said operating ports or flow of fluid from either of said operating ports.

6. The construction of claim 5 wherein each second chamber aforesaid is closed at each of said auixilary housing faces and wherein such chamber closure is selectively effected by a flow control means aforesaid or a closure member.

References Cited by the Examiner

UNITED STATES PATENTS

| 1,844,107 | 2/1932 | Sheperdson | 91—443 |
| 2,345,837 | 4/1944 | Smith | 91—443 |
| 3,199,535 | 8/1965 | Baer | 137—596 |

References Cited by the Applicant

UNITED STATES PATENTS

| 50,320 | 7/1865 | Albertson. |
| 2,466,376 | 4/1949 | Carey. |
| 2,568,528 | 9/1951 | Welte. |
| 2,891,516 | 6/1959 | Pippenger. |
| 2,943,604 | 7/1960 | Chubb. |
| 3,106,938 | 10/1963 | Gordon. |

MARTIN P. SCHWADRON, *Primary Examiner.*

P. T. COBRIN, B. L. ADAMS, *Assistant Examiners.*